April 2, 1963     R. D. WASSERMAN ETAL     3,084,074
COATED WELDING ROD
Filed Oct. 5, 1959

INVENTORS
RENE D. WASSERMAN
AND JOSEPH F. QUAAS

BY Connolly and Hutz
ATTORNEYS

3,084,074
COATED WELDING ROD

Rene D. Wasserman, Stamford, Conn., and Joseph F. Quaas, Island Park, N.Y., assignors to Eutectic Welding Alloys Corporation, Flushing, N.Y., a corporation of New York
Filed Oct. 5, 1959, Ser. No. 844,585
17 Claims. (Cl. 117—204)

This is a continuation-in-part of U.S. patent application Serial Number 697,193, filed November 18, 1957, now abandoned.

This invention relates to a welding rod having a waterproof coating, and more particularly relates to such a welding rod in which this coating operates to prevent moisture pick up during storage or to facilitate underwater welding.

Welding rods bearing conventional flux coatings are prone to pick up moisture during storage which is likely to cause substantial porosity in welds deposited from these rods if they have been continuously exposed to a relatively high humidity for periods of a month or more. This deterioration may be pronounced enough to cause rods exposed to relative humidities in the neighborhood of 88% for any appreciable period of time to be completely unusable. Attempts have, therefore, been made to incorporate substantial amounts of glass frit within the flux coatings themselves to exclude moisture. However, these glass frit additions generally interfere with the ease of deposition of these rods.

Furthermore it has generally been the practice to utilize electrodes for welding under water which incorporate a core metal similar in composition to the type of metal being welded, for example, a mild steel core for mild steel plates. These cores have usually been coated with types of flux coatings conventionally used with these mild steel compositions. Attempts have been made to shield or protect these underwater electrodes from the surrounding water by covering them with waterproofing media such as varnishes, lacquers, rubber tape, cellulose acetate, and other acetate derivatives; but known coatings are only effective for limited periods of time.

These known electrodes deposit weld metal under water having only 80% of its normal tensile strength and as little as 50% of its normal ductility. The reason for this is not completely understood, but it is suspected that this loss in ductility is due to the hardening effected by the drastic quenching action of surrounding water. This results in the physical properties of the deposited metal, for example steel, being adversely affected to average only 50,000 p.s.i. in tensile strength and only 10% elongation before failure. Underwater repairs up until the present have, therefore, been little more than temporary in nature requiring later expensive and time-consuming drydocking and rewelding. Deposits of other weld metal compositions are, accordingly, affected disadvantageously under water.

An object of this invention is to provide an efficient and economical welding rod which is not susceptible to moisture pick up even when stored under relatively high humidity for considerable periods of time.

Another object of this invention is to provide an electrode for metallic arc welding under water which deposits weld metal having optimum physical characteristics to permit repairs of a permanent nature to be made under water.

In accordance with this invention, a welding rod having a metallic core and a primary flux coating compatible with it, is made moisture-proof by covering it with a thin coating of a composition incorporating a non-hygroscopic glass frit and a suitable binder. This outer coating ranges in thickness approximately from 0.010 to 0.025 inch in radial dimension thereby, making it thick enough to exclude moisture and thin enough to avoid interference with the deposition of the metallic core.

Further in accordance with this invention, an electrode for welding metals under water includes a metallic core and a primary fluxing coating of a composition compatible therewith. The primary coating is coated directly over the core, and a relatively thin outer coating of a substantially waterproof material is deposited over it to protect it from the surrounding water prior to and during the welding operation. A highly advantageous coated electrode, for example, for welding ferrous metals under water includes a stainless steel core and a primary coating which cooperate to deposit weld metal having an austenite-ferrite structure. An extremely effective waterproof outer coating for this electrode is provided by a composition including approximately 50% by weight of a non-hygroscopic glass frit. Electrodes made accordingly have deposited weld metal having tensile strengths as high as 85,000 p.s.i. and 15–20% elongation before failure. These electrodes can, therefore, be used to make permanent repairs under water. The aforementioned highly effective glass frit outer waterproof coating also, accordingly, enhances the operating efficiency of other core metals when they are used in underwater electrodes.

Novel features and advantages of the present invention will become apparent to one skilled in the art from a reading of the following description in conjunction with the accompanying drawing wherein similar reference characters refer to similar parts and in which.

Figure 1:
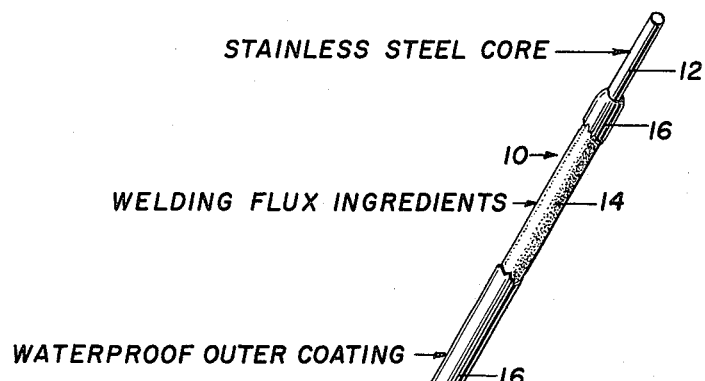
FIG. 1 is a perspective view of an embodiment of this invention.
Figure 2:
FIG. 2 is a cross-sectional view taken through FIG. 1 along the line 2—2.

In FIG. 1 is shown an electrode 10 for welding under water including, for example, a core 12 made of stainless steel of a composition which deposits weld metal having austenite-ferrite structure. A primary coating 14 of welding flux ingredients which are compatible with the composition of core 12 is directly deposited upon core 12 by conventional methods. A relatively thin outer coating 16 of substantially waterproof material is deposited over the primary coating 14 in a manner later described in detail. Core 12 is, for example, approximately ⅛ inch in diameter. Primary coating 14, for example, range from ⅟₃₂ of an inch to ⅟₁₆ of an inch in radial dimension, and outer coating 16, for example, ranges from 0.010 to 0.025 inch in radial dimension.

A. UNDERWATER WELDING RODS

*(1) Electrodes Incorporating a Stainless Steel Core*

CORE COMPOSITION

Core wire 12 is made, for example, of stainless steel grades 309 or 312. These grade designations are concurrently used by the American Iron and Steel Institute (AISI), The American Society for Testing Materials (ASTM) or the American Welding Society (AWS). These particular stainless steel alloys provide a two-phase weld deposit with substantial percentages of ferrite in an austenite matrix. This type of weld metal, for reasons which are not entirely understood, provides an unexpectedly strong weld under water when deposited from an electrode of the type herein described. Other stainless steel compositions can also be used as long as they provide the aforementioned austenite-ferrite structure in the deposited weld metal, and illustrative ranges of compositions and preferred examples are indicated in the following tables:

| Constituent | Percent by weight | | |
|---|---|---|---|
| | Range | Preferred range | Preferred example |
| C | .20 max | .20 max | 0.12 |
| Mn | 4.50 max | 1.00/2.00 | 1.75 |
| Si | 1.00 max | 1.00/max | 0.70 |
| Ni | 4.00/20.00 | 8.00/14.00 | 12.00 |
| Cr | 12.00/30.00 | 20.00/30.00 | 25.00 |
| Mo | .20/3.00 | .20/1.00 | 0.30 |
| Fe | Balance | Balance | Balance |

| Constituent | Percent by weight | | |
|---|---|---|---|
| | Range | Preferred range | Preferred example |
| C | .20 max | .20 max | 0.12 |
| Mn | 4.50 max | 1.00/2.00 | 1.75 |
| Si | 1.00 max | 1.00/max | 0.70 |
| Ni | 4.00/20.00 | 8.00/14.00 | 12.00 |
| Cr | 12.00/30.00 | 20.00/30.00 | 25.00 |
| Mo | .20/3.00 | .20/1.00 | 0.30 |
| Cb | 0/3.00 | .50/2.00 | 1.00 |
| Fe | Balance | Balance | Balance |

As indicated in the above table, columbium is sometimes found helpful either in the core or as an additive to the coating formulation because of its ferrite-forming tendencies.

PRIMARY COATING

Primary coating 14 includes conventional fluxing ingredients which are compatible with stainless steel core wire 12. Various ingredients that have been found advantageous for fluxing stainless steel core wires are described, for example in U.S. Letters Patent 2,632,835. In that patent, some of the chromium deposited in the weld metal is introduced from the flux, but this mode of introduction is not essential for underwater application even though it may be utilized to provide the further advantages described therein. Some of the coating compositions described in Patent 2,632,835 are indicated in the following table; but the chromium metal powder content may be eliminated if the chromium content of the core wire is sufficient to provide a deposited austenite-ferrite structure.

| Constituent | Parts by weight | |
|---|---|---|
| | Range | Preferred example |
| Calcium fluoride | 5 to 20 | 15 |
| Calcium carbonate | 7 to 25 | 20 |
| Titanium dioxide | 20 to 45 | 43 |
| Calcium silicate | 5 to 14 | 11 |
| Chromium metal powder | 0 to 45 | |
| Ferro-silicon alloy | 5 to 15 | 11 |

Other suitable fluxing ingredients for the primary coating are described in U.S. Letters Patent 2,697,159 on column 4, lines 38–59 and in the various examples in that patent; and, any conventional fluxing ingredients compatible with the stainless steel core wire may be used effectively.

| Constituent | Parts by weight | |
|---|---|---|
| | Range | Preferred example |
| Calcium fluoride | 5 to 20 | 15 |
| Calcium carbonate | 7 to 25 | 20 |
| Titanium dioxide | 20 to 45 | 35 |
| Calcium silicate | 5 to 14 | 11 |
| Chromium metal powder | 0 to 45 | |
| Ferro-silicon alloy | 5 to 15 | 11 |
| Ferro-columbium | 4 to 12 | 8 |

As previously mentioned, the addition of columbium to the coating formulation helps in forming the desired austenite-ferrite structure.

OUTER WATERPROOF COATING

Outer waterproof coating 16 is relatively thin in comparison to primary coating 14 and may range, for example, from .010 inch in radial dimension to 0.025 inch in radial dimension. When its thickness exceeds 0.025 inch, the efficiency of the rod is adversely affected.

A highly effective composition for outer coating 16 includes a non-hygroscopic glass frit which is applied over primary coating 14 and then fired at 1200° F., for example, for ten minutes to produce a smooth glazed finish. This glazed or glass type coating effectively excludes moisture even when submerged for considerable periods of time and it, therefore, prevents breakdown of the primary flux coating before and during the welding operation. This protective coating, therefore, permits the duration of continuous periods of underwater welding to be unexpectedly prolonged.

A required feature of a useable glass frit is that this unvitrified material from which the resultant glass is formed must have a relatively low range of softening temperatures. This temperature range cannot be greater than a predetermined maximum, or the components of the primary flux coating 14 are adversely affected. This softening temperature range, for example, must be maintained between 1000 to 1200° F. in order to prevent deterioration of the primary coating. Higher temperatures can deteriorate water-soluble binders which may be used in the primary coating, or they might decompose the various carbonates employed therein. An example of ranges of composition and specific examples of advantageous compositions for use in the outer coating are described in the following table:

| Constituent | Parts by weight | |
|---|---|---|
| | Range | Preferred example |
| Glass frit | 40/70 | 60 |
| Bentonite | 2/12 | 3 |
| Water-soluble silicate | 20/50 | 37 |

The water-soluble silicate is, for example, potassium or sodium silicate or a mixture of the two. Mica, talc or a flocculent may be employed, for example, instead of bentonite.

Various compositions of glass frits having the aforementioned temperature softening range between 1000 and 1200° F. are listed in the following:

GLASS FRITS

| Constituents— | Percent by weight |
|---|---|
| Lithium oxide | 4.0 |
| Potassium oxide | 9.0 |
| Sodium oxide | 15.6 |
| Calcium oxide | 7.7 |
| Aluminum oxide | 6.1 |
| Silicon dioxide | 39.4 |
| Titanium dioxide | 11.5 |
| Fluoride salt | 6.7 |
| Total | 100.0 |

| Constituents— | Approximate percent by weight |
|---|---|
| Silicon dioxide | 50 |
| Potassium oxide | 10 |
| Lead oxide | 30 |
| Titanium dioxide | 10 |
| Fluorine (trace) | — |
| Total | 100 |

| Constituent | Parts by weight | |
|---|---|---|
| | Range | Example |
| Silicon dioxide | 35–50 | 46.0 |
| Titanium dioxide | 10 | 8.0 |
| Manganese oxide | 2–10 | 6.0 |
| Calcium oxide | 5–10 | 9.0 |
| Aluminum oxide | 5–10 | 9.0 |
| Potassium oxide | 10 | 10.0 |
| Fluoride salt | 5–13 | 12.0 |

Other suitable compositions for the glass frit are described in the aforementioned U.S. Letters Patent 2,697,159. However, it should be noted that the glass frit is used herein to coat the primary coating and not merely to bond the particles of the primary flux to each other and to the welding electrode; but, if desired, the glass frit could also be used in the primary coating within the spirit of this invention. The waterproof outer coating forms and maintains a protective thimble around the arc by providing a covering which is consumed at a slower rate than the core and primary flux coating.

Other hydrophobic compositions, such as organic materials might be used for this substantially waterproof outer coating. However, materials should be used which do not contribute enough carbon to the weld deposit to adversely affect the austenite-ferrite ratio.

PREFERRED OVERALL ELECTRODE COMPOSITION

An illustrative preferred overall composition for an embodiment of this invention incorporating a stainless steel core includes, for example, the following:

primary coating does not include cellulose or another organic material which decomposes at temperatures in the neighborhood of 1100° F., the temperature of fluidity of the glass frit. Useable primary coating formations for these aforementioned mild steel cores are accordingly of the low-hydrogen or basic types. A flux formulation of this type contains, for example, 30–40% by weight of calcium fluoride and 30–40% by weight of calcium carbonate with the balance including, for example, equal parts by weight of ferro-alloys and aluminum silicates.

A preferred outer coating composition for these mild steel electrodes is made, for example, of the aforementioned glass frit, bentonite and water-soluble silicate composition. This highly effective waterproof outer coating permits mild steel electrodes to be effectively utilized under water even though submerged for considerable periods of time; but results are, of course, not quite as striking as those achieved with the previously described stainless steel core wires.

(3) *Electrodes Incorporating Nickel Composition Cores*

For welding submerged cast iron parent materials, an electrode incorporating a nickel, Monel or nickel-iron alloy core wire is permitted to operate effectively under water by utilizing a compatible primary flux coating and the aforementioned highly effective glass frit waterproof outer coating. Compatible flux compositions for core wires containing nickel and covered by a glass frit outer coating are, for example, described in U.S. Letters Patent 2,471,803. A particularly effective flux coating is described in Example 1 of that patent, set forth in column 5, lines 25–62.

| Core wire | | Primary coating | | Outer coating | |
|---|---|---|---|---|---|
| Const. | Percent by weight | Const. | Parts by weight | Const. | Parts by weight |
| C | 0.12 | Calcium fluoride | 15 | Glass frit | 60 |
| Mn | 1.75 | Calcium carbonate | 20 | Bentonite | 3 |
| Si | 0.70 | Titanium dioxide | 43 | Water-soluble silicate | 37 |
| Ni | 12.00 | Calcium silicate | 11 | | |
| Cr | 25.00 | Chromium metal powder | | | |
| Mo | 0.30 | Ferro-silicon alloy | 11 | | |
| Fe | Balance | | | | |

A rod incorporating a ferrite content is made in accordance with the following:

(4) *Electrodes Incorporating Cores Including Copper*

For welding submerged copper and copper alloy parent

| Core wire | | Primary coating | | Outer coating | |
|---|---|---|---|---|---|
| Const. | Percent by weight | Const. | Parts by weight | Const. | Parts by weight |
| C | 0.12 | Calcium fluoride | 15 | Glass frit | 60 |
| Mn | 1.75 | Calcium carbonate | 20 | Bentonite | 3 |
| Si | 0.70 | Titanium dioxide | 35 | Water-soluble silicate | 37 |
| Ni | 12.00 | Calcium silicate | 11 | | |
| Cr | 25.00 | Chromium metal powder | | | |
| Mo | 0.30 | Ferro-silicon alloy | 11 | | |
| Fe | Balance | Ferro-Columbium | 8 | | |

OPERATION

During the welding operation, the waterproof outer coating or protective thimble effectively excludes water from interfering with the fluxing and deposition of weld metal incorporating ferrite in an austenite matrix. The ferrite content is, for example, maintained between 10 to 20% by weight. An unexpectedly strong and ductile weld metal is, therefore, deposited under water.

(2) *Electrodes Incorporating a Mild Steel Core*

Mild steel cores, for example, conforming to AWS Classifications E 7016, E 8016, E 9016, and E 10016, can also be used in underwater electrodes as long as their materials, an electrode incorporating an aluminum bronze or copper alloy core wire is made extremely effective by utilizing the aforementioned glass frit waterproof outer coating together with a compatible outer flux coating. A compatible primary flux coating for this type of electrode is, for example, described in U.S. Letters Patent 2,731,373, and particularly in column 3, lines 10–40 of that patent.

B. WELDING RODS FOR GENERAL USE

The aforementioned outer water-proof coating incorporates a non-hygroscopic glass frit and a suitable binder, which coating ranges in thickness from 0.010 to 0.025 inch in radial dimension, is remarkably effective for excluding moisture from a flux coated welding rod during storage even under relatively high humidity for extended periods of time. An example of such a welding rod may be obtained by covering the coated rod described in U.S. Letters Patent 2,632,835 with a thin outer coating of the aforementioned type which includes the following constituents in the indicated ranges of parts by weight.

| Constituents— | Range |
| --- | --- |
| Glass frit | 40/70 |
| Bentonite | 2/12 |
| Water-soluble silicate | 20/50 |

The aforementioned glass frit may be essentially composed of the following constituents in the indicated ranges of parts by weight:

| Constituents— | Range |
| --- | --- |
| Silicon dioxide | 35–50 |
| Titanium dioxide | 10 |
| Manganese oxide | 2–10 |
| Calcium oxide | 5–10 |
| Aluminum oxide | 5–10 |
| Potassium oxide | 10 |
| Fluoride salt | 5–13 |

A specific embodiment of this form of the invention is, therefore, formed in accordance with the following.

A stainless steel core having a diameter of 1/8 inch and the following composition:

| Constituents— | Percent by weight |
| --- | --- |
| Chromium | 19 |
| Nickel | 9 |
| Manganese | 2 |
| Carbon | 0.15 |
| Iron | Balance | is coated with a coating composition composed as follows:

| Constituents— | Parts by weight |
| --- | --- |
| Calcium fluoride | 6 |
| Calcium carbonate | 10 |
| Titanium dioxide | 23 |
| Calcium silicate | 6 |
| Chromium metal powder | 40 |
| Ferro-silicon alloy | 7 |

A water-proof outer coating having a radial thickness of 0.020 inch is applied over the primary coating and incorporates the following constituents in the indicated parts by weight:

| Constituents— | Parts by weight |
| --- | --- |
| Glass frit | 60 |
| Bentonite | 3 |
| Water-soluble silicate | 37 |

The aforementioned glass frit is made in accordance with either of the specific examples previously mentioned in this application, and the core and primary flux coating are merely representatives of any useful type of such elements.

Welding rods coated in this manner may be stored indefinitely under conditions of relatively high humidity without deteriorating to any discernible degree. This is demonstrated by the fact that electrodes coated accordingly were stored at a relative humidity maintained at 88% at 75° F. for as long as 60 days without causing any porosity in weld beads deposited thereby. This is highly remarkable in view of the marked degree of porosity displayed by uncoated electrodes having a similar core and primary coating after storage under such conditions for only 15 days. Furthermore, after 60 days under high humidity storage, the coating bonds of unprotected electrodes were substantially destroyed making them entirely unusable.

Despite the remarkable protection endowed by the coating of this invention against moisture pickup, this coating in no way interferes with normal deposition of the welding rod either by arc welding or by torch application. Although this coating is rather thin, it does not burn off so quickly that it leaves the primary coating unprotected which is not so important in normal atmosphere, but this property is highly beneficial under water.

What is claimed is:

1. A welding rod for welding ferrous metals under water essentially consisting of a stainless steel core having a chromium content of approximately 12 to 30 percent by weight and a nickel content of approximately 4 to 20 percent by weight, a primary coating of welding flux ingredients which are compatible with said core composition, said core and said primary coating being of a composition which deposits weld metal having an austenite-ferrite structure, and a relatively thin outer coating ranging approximately from 0.010 of an inch to approximately 0.025 of an inch in radial thickness non-hygroscopic glass deposited over said primary coating.

2. A welding rod as set forth in claim 1 wherein said core alone is of a composition which deposits weld metal having a substantially austenite-ferrite structure.

3. A welding rod as set forth in claim 2 wherein said core is essentially composed of the following constituents in the indicated ranges of percentages by weight:

| Constituents— | Range |
| --- | --- |
| C | .20 max. |
| Mn | 4.50 max. |
| Si | 1.00 max. |
| Ni | 4.00/20.00. |
| Cr | 12.00/30.00. |
| Mo | .20/3.00. |
| Fe | Balance. |

4. A welding rod as set forth in claim 2 wherein said core is essentially composed of the following constituents in the indicated percentages by weight:

| Constituents— | Percent by weight |
| --- | --- |
| C | 0.12 |
| Mn | 1.75 |
| Si | 0.70 |
| Ni | 12.00 |
| Cr | 25.00 |
| Mo | 0.30 |
| Fe | Balance |

5. A welding rod as set forth in claim 1 wherein said primary coating is essentially composed of the following constituents in the indicated ranges of parts by weight:

| Constituents— | Range |
| --- | --- |
| Calcium fluoride | 5 to 20 |
| Calcium carbonate | 7 to 25 |
| Titanium dioxide | 20 to 45 |
| Calcium silicate | 5 to 14 |
| Chromium metal powder | 0 to 45 |
| Ferro-silicon alloy | 5 to 15 |

6. A welding rod as set forth in claim 1 wherein said primary coating is essentially composed of the following constituents in the indicated parts by weight:

| Constituents— | Parts by weight |
| --- | --- |
| Calcium fluoride | 15 |
| Calcium carbonate | 20 |
| Titanium dioxide | 43 |
| Calcium silicate | 11 |
| Ferro-silicon alloy | 11 |

7. A welding rod as set forth in claim 1 wherein said waterproof coating is essentially composed of the following constituents in the indicated ranges of parts by weight:

| Constituents— | Range |
| --- | --- |
| Glass frit | 40/70 |
| Bentonite | 2/12 |
| Water-soluble silicate | 20/50 |

8. A welding rod as set forth in claim 1 wherein said waterproof coating is essentially composed of the following constituents in the indicated parts by weight:

| Constituents— | Parts by weight |
|---|---|
| Glass frit | 60 |
| Bentonite | 3 |
| Water-soluble silicate | 37 |

9. A welding rod as set forth in claim 1 wherein said relatively thin outer coating incorporates a glass frit essentially composed of the following constituents in the indicated parts by weight:

| Constituents— | Range |
|---|---|
| Silicon dioxide | 35–50 |
| Titanium dioxide | 10 |
| Manganese oxide | 2–10 |
| Calcium oxide | 5–10 |
| Aluminum oxide | 5–10 |
| Potassium oxide | 10 |
| Fluoride salt | 5–13 |

10. A welding rod as set forth in claim 1 wherein said relatively thin outer coating incorporates a glass frit essentially composed of the following constituents:

| Constituents— | Percent by weight |
|---|---|
| Lithium oxide | 4.0 |
| Potassium oxide | 9.0 |
| Sodium oxide | 15.6 |
| Calcium oxide | 7.7 |
| Aluminum oxide | 6.1 |
| Silicon dioxide | 39.4 |
| Titanium dioxide | 11.5 |
| Fluoride salt | 6.7 |
| Total | 100.0 |

11. A welding rod as set forth in claim 1 wherein said relatively thin outer coating incorporates a glass frit essentially composed of the following constituents:

| Constituents— | Approximate percent by weight |
|---|---|
| Silcon dioxide | 50 |
| Potassium oxide | 10 |
| Lead oxide | 30 |
| Titanium dioxide | 10 |
| Fluorine (trace) | -- |
| Total | 100 |

12. A welding rod essentially consisting of a metallic core, a primary coating of welding flux ingredients which are compatible with said core compositions and susceptible to deterioration upon absorption of water, an outer waterproof coating incorporating a non-hygroscopic glass frit and a suitable binder, said outer coating being thick enough to protect said primary coating from moisture pick up, and said outer coating being thin enough to avoid interference with the operating efficiency of said rod.

13. A welding rod as set forth in claim 12 wherein said waterproof outer coating is essentially composed of the following constituents in the indicated ranges of parts by weight:

| Constituents— | Range |
|---|---|
| Glass frit | 40/70 |
| Bentonite | 2/12 |
| Water-soluble silicate | 20/50 |

14. A welding rod as set forth in claim 12 wherein said waterproof outer coating is essentially composed of the following constituents in the indicated parts by weight:

| Constituents— | Parts by weight |
|---|---|
| Glass frit | 60 |
| Bentonite | 3 |
| Water-soluble silicate | 37 |

15. A welding rod essentially consisting of a metallic core, a primary coating of welding flux ingredients which are compatible with the composition of said core and susceptible to deterioration upon absorption of water, an outer waterproof coating incorporating a non-hygroscopic glass frit and a suitable binder, and said outer coating ranging in thickness from approximately 0.010 to approximately 0.025 inch in radial dimension.

16. A welding rod as set forth in claim 15 wherein said waterproof outer coating is essentially composed of the following constituents in the indicated ranges of parts by weight:

| Constituents— | Range |
|---|---|
| Glass frit | 40/70 |
| Bentonite | 2/12 |
| Water-soluble silicate | 20/50 |

17. A welding rod as set forth in claim 15 wherein said relatively thin outer coating incorporates a glass frit essentially composed of the following constituents in the indicated parts by weight:

| Constituents— | Range |
|---|---|
| Silicon dioxide | 35–50 |
| Titanium dioxide | 10 |
| Manganese oxide | 2–10 |
| Calcium oxide | 5–10 |
| Aluminum oxide | 5–10 |
| Potassium oxide | 10 |
| Fluoride salt | 5–13 |

References Cited in the file of this patent

UNITED STATES PATENTS

| 1,992,792 | Weed | Feb. 26, 1935 |
| 2,436,867 | Lee | Mar. 2, 1948 |
| 2,544,000 | Wasserman | Mar. 6, 1951 |
| 2,552,176 | Hummitzsch | May 8, 1951 |
| 2,632,835 | Wasserman | Mar. 24, 1953 |
| 2,697,159 | Donahey | Dec. 14, 1954 |

FOREIGN PATENTS

| 563,251 | Canada | Sept. 16, 1958 |